(12) United States Patent
Kirby

(10) Patent No.: US 6,819,512 B2
(45) Date of Patent: Nov. 16, 2004

(54) TRIPLE-ATTRIBUTE METHOD OF ENCODING AND DECODING MAGNETIC DATA

(75) Inventor: Kyle K. Kirby, Diamond Bar, CA (US)

(73) Assignee: ProtoScience, Inc., Anaheim, CA (US)

( * ) Notice: Subject to any disclaimer, the term of this patent is extended or adjusted under 35 U.S.C. 154(b) by 51 days.

(21) Appl. No.: 10/370,363

(22) Filed: Feb. 18, 2003

(65) Prior Publication Data

US 2004/0160692 A1 Aug. 19, 2004

(51) Int. Cl.$^7$ .............. G11B 5/09; G11B 20/08
(52) U.S. Cl. .............. 360/29; 360/40; 360/39; 360/45; 360/32; 360/51; 369/47.1; 369/47.19; 369/47.2
(58) Field of Search .............. 360/40, 29, 39, 360/51, 52, 45, 32, 69; 369/59.1, 47.1, 47.19, 47.2

(56) References Cited

U.S. PATENT DOCUMENTS

| | | | |
|---|---|---|---|
| 3,226,685 A | 12/1965 | Potter et al. | 340/174 |
| 3,374,475 A | 3/1968 | Gabor | 340/174 |
| 3,377,583 A | 4/1968 | Sims, Jr. | 340/174 |
| 3,643,228 A | 2/1972 | Lipp | 340/172 |
| 3,685,033 A | 8/1972 | Srivastava et al. | 340/174 |
| 3,792,454 A | 2/1974 | Lipp | 340/174 |
| 4,000,512 A | 12/1976 | Lau | 340/45 |
| 4,005,478 A | 1/1977 | Beinhauer et al. | 340/40 |
| 4,323,931 A | 4/1982 | Jacoby | 360/40 |
| 4,343,023 A | 8/1982 | Nishimura et al. | 360/40 |
| 4,357,634 A | 11/1982 | Chung | 360/40 |
| 4,488,142 A | 12/1984 | Franaszek | 341/59 |
| 4,506,252 A | 3/1985 | Jacoby et al. | 341/57 |
| 4,633,340 A | 12/1986 | Hayakawa | 360/69 |
| 4,707,681 A | 11/1987 | Eggenberger et al. | 341/59 |
| RE32,937 E | 5/1989 | Silvy et al. | 365/234 |
| 4,928,187 A | 5/1990 | Rees | 360/40 |
| 4,949,196 A | 8/1990 | Davie et al. | 360/40 |
| 5,095,392 A | 3/1992 | Shimazaki et al. | 360/40 |
| 5,260,703 A | 11/1993 | Nguyen et al. | 341/100 |
| 5,293,369 A | 3/1994 | Melas et al. | 369/59 |
| 5,402,272 A | 3/1995 | Nakatsu et al. | 360/39 |
| 5,422,760 A | 6/1995 | Abbott et al. | 341/59 |
| 5,592,457 A | 1/1997 | Bailey | 369/59 |
| 5,631,887 A | 5/1997 | Hurst, Jr. | 369/47 |
| 5,638,065 A | 6/1997 | Hassner et al. | 341/59 |
| 5,696,639 A | 12/1997 | Spurbeck et al. | 360/51 |
| 5,739,969 A | 4/1998 | Garza | 360/51 |
| 5,802,031 A | 9/1998 | Clark et al. | 369/59 |
| 5,818,653 A | 10/1998 | Park et al. | 360/32 |
| 5,844,507 A | 12/1998 | Zook | 341/50 |
| 6,014,355 A | 1/2000 | Bailey | 369/59 |
| 6,032,284 A | 2/2000 | Bliss | 714/792 |
| 6,151,149 A | 11/2000 | Rybicki et al. | 359/186 |
| 6,167,550 A | 12/2000 | Gray | 714/769 |
| 6,212,230 B1 | 4/2001 | Rybicki et al. | 375/239 |
| 6,229,458 B1 | 5/2001 | Altekar et al. | 341/59 |
| 6,246,346 B1 | 6/2001 | Cloke et al. | 341/59 |
| 2001/0038583 A1 | 11/2001 | Miyagawa et al. | 369/47.17 |
| 2001/0055353 A1 | 12/2001 | Rybicki et al. | 375/353 |

*Primary Examiner*—David Hudspeth
*Assistant Examiner*—Natalia Figueroa

(57) ABSTRACT

A method of encoding and decoding data involving the simultaneous application of pulse amplitude modulation, pulse width modulation, and pulse position modulation systems to data intended for storage on a magnetic disk medium.

2 Claims, 16 Drawing Sheets

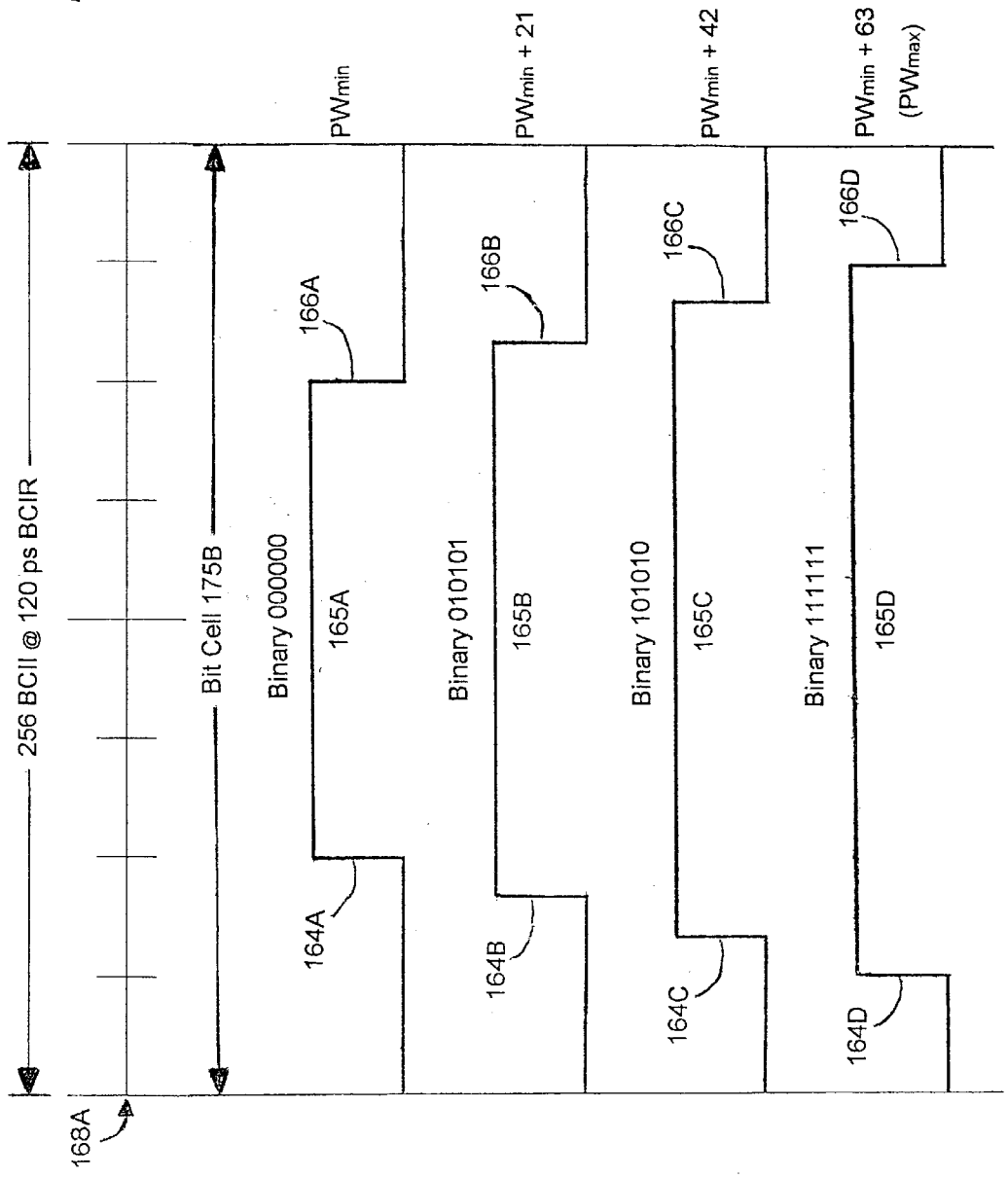

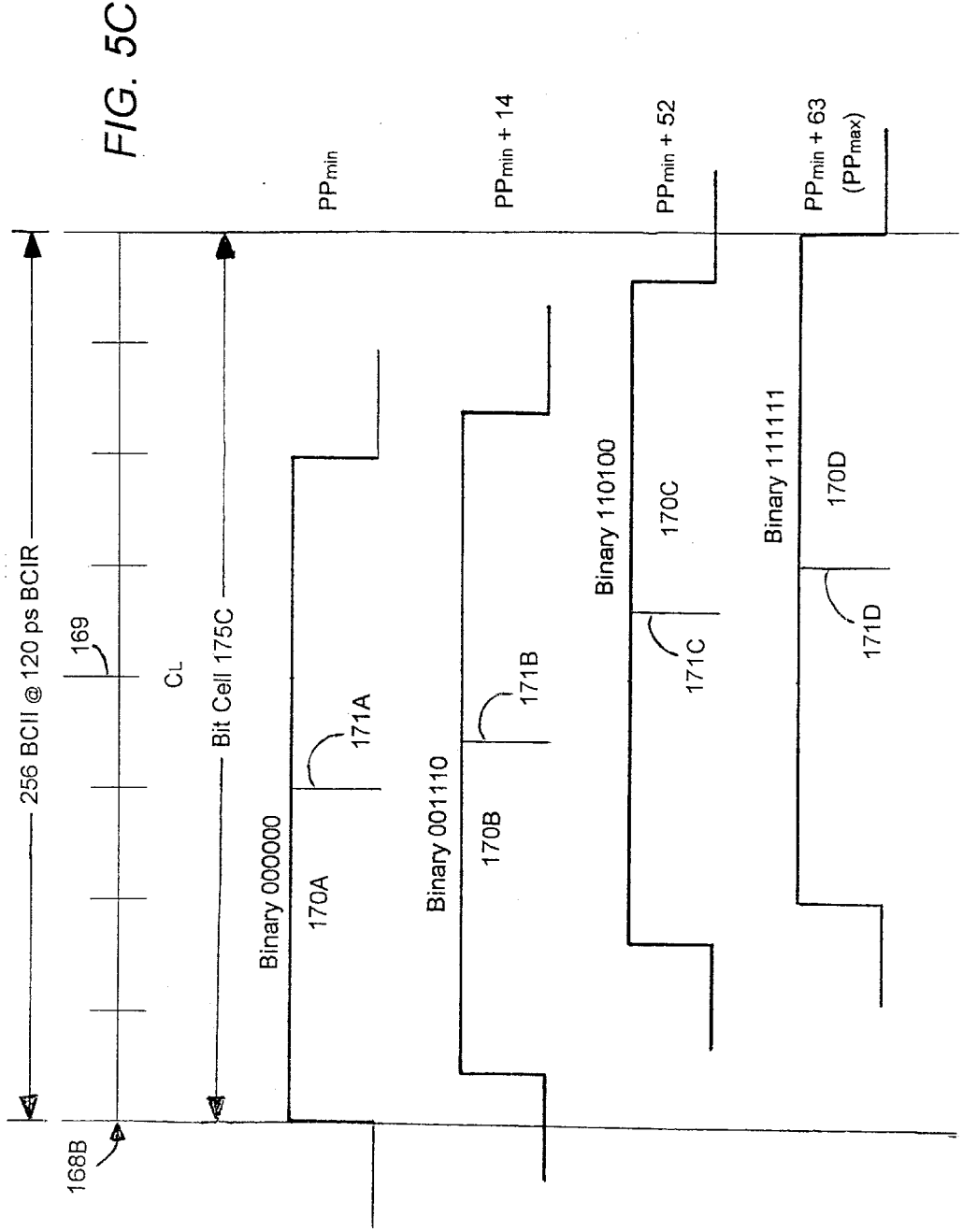

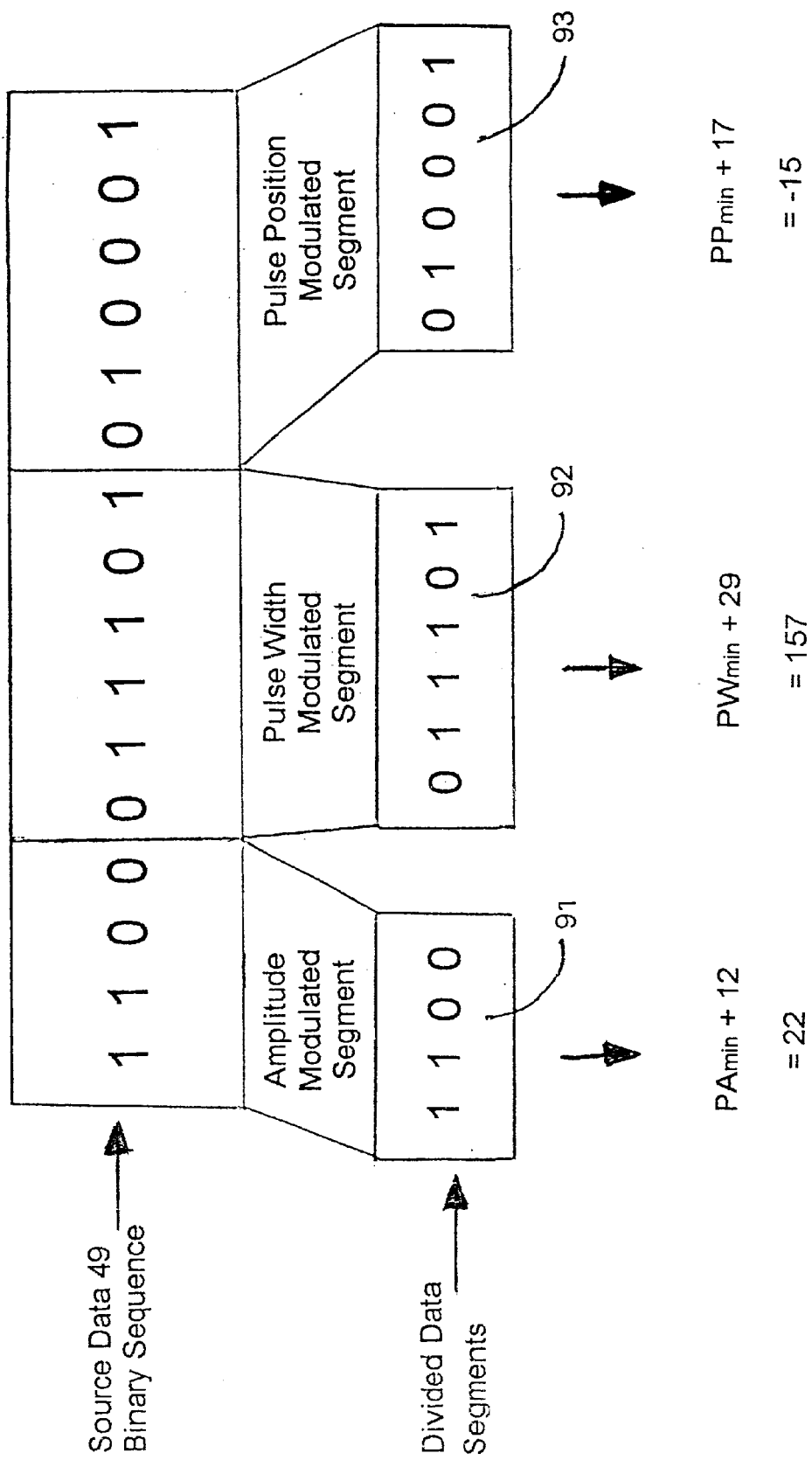

FIG. 6A

| Binary | Decimal | PAI | % Max |
|--------|---------|-----|-------|
| 0000 | 0 | 10 | 40 |
| 0001 | 1 | 11 | 44 |
| 0010 | 2 | 12 | 48 |
| 0011 | 3 | 13 | 52 |
| 0100 | 4 | 14 | 56 |
| 0101 | 5 | 15 | 60 |
| 0110 | 6 | 16 | 64 |
| 0111 | 7 | 17 | 68 |
| 1000 | 8 | 18 | 72 |
| 1001 | 9 | 19 | 76 |
| 1010 | 10 | 20 | 80 |
| 1011 | 11 | 21 | 84 |
| 1100 | 12 | 22 | 88 |
| 1101 | 13 | 23 | 92 |
| 1110 | 14 | 24 | 96 |
| 1111 | 15 | 25 | 100 |

PULSE AMPLITUDE CONVERSION TABLE

FIG. 6B

| Binary | Decimal | PWI | Duration (ps) |
|---|---|---|---|
| 000000 | 0 | 128 | 15,360 |
| 000001 | 1 | 129 | 15,480 |
| 000010 | 2 | 130 | 15,600 |
| 000011 | 3 | 131 | 15,720 |
| 000100 | 4 | 132 | 15,840 |
| 000101 | 5 | 133 | 15,960 |
| 000110 | 6 | 134 | 16,080 |
| 000111 | 7 | 135 | 16,200 |
| . | . | . | . |
| . | . | . | . |
| . | . | . | . |
| . | . | . | . |
| 111000 | 56 | 184 | 22,080 |
| 111001 | 57 | 185 | 22,200 |
| 111010 | 58 | 186 | 22,320 |
| 111011 | 59 | 187 | 22,440 |
| 111100 | 60 | 188 | 22,560 |
| 111101 | 61 | 189 | 22,680 |
| 111110 | 62 | 190 | 22,800 |
| 111111 | 63 | 191 | 22,920 |

*PULSE WIDTH CONVERSION TABLE*

FIG. 6C

| Binary | Decimal | PPI | Offset (ps) |
|--------|---------|-----|-------------|
| 000000 | 0 | -32 | -3,840 |
| 000001 | 1 | -31 | -3,720 |
| 000010 | 2 | -30 | -3,600 |
| 000011 | 3 | -29 | -3,480 |
| 000100 | 4 | -28 | -3,360 |
| 000101 | 5 | -27 | -3,240 |
| 000110 | 6 | -26 | -3,120 |
| 000111 | 7 | -25 | -3,000 |
| . | . | . | . |
| . | . | . | . |
| . | . | . | . |
| . | . | . | . |
| 111000 | 56 | +24 | +2,880 |
| 111001 | 57 | +25 | +3,000 |
| 111010 | 58 | +26 | +3,120 |
| 111011 | 59 | +27 | +3,240 |
| 111100 | 60 | +28 | +3,360 |
| 111101 | 61 | +29 | +3,480 |
| 111110 | 62 | +30 | +3,600 |
| 111111 | 63 | +31 | +3,720 |

*PULSE POSITION CONVERSION TABLE*

FIGURES OF MERIT

| CODE | N | M | Smin | Smax | FR | D | RW | EPD | BW |
|---|---|---|---|---|---|---|---|---|---|
| NRZI | 1 | 1 | T | Unlimited | Infinity | 1 | 1T | Unlimited | 294 |
| FM | 1 | 2 | 0.5T | T | 2 | 0.5 | 0.5T | 1T | 882 |
| MFM | 1 | 2 | T | 2T | 2 | 0.5 | 0.5T | 2T | 442 |
| GABOR | 2 | 3 | 0.66T | 1.3T | 2 | 0.66 | 0.66T | 1.3T | 662 |
| 3PM | 3 | 2 | 1.5T | 6T | 4 | 1.5 | 0.5T | 6T | 222 |
| GCR | 4 | 5 | T | 3T | 3 | 0.8 | 0.4T | 3T | 294 |

FIG. 8A

| CODE | N | M | Smin | Smax | FR | D | RW | EPD | BW |
|---|---|---|---|---|---|---|---|---|---|
| TAM | 20 | 1 | 0.5T | T | 2 | 20 | 1T | 1T | 65 |

FIG. 8B

AMPLITUDE INCREMENTS

| BCII | 1 | 2 | 4 | 8 | 16 | 32 | 64 | 128 | 256 | 512 | 1,024 | 2,048 | 4,096 | 8,192 |
|---|---|---|---|---|---|---|---|---|---|---|---|---|---|---|
| 8 | 2x | 3x | 4x | 5x | 6x | 7x | 8x | 9x | 10x | 11x | 12x | 13x | 14x | 15x |
| 16 | 4x | 5x | 6x | 7x | 8x | 9x | 10x | 11x | 12x | 13x | 14x | 15x | 16x | 17x |
| 32 | 6x | 7x | 8x | 9x | 10x | 11x | 12x | 13x | 14x | 15x | 16x | 17x | 18x | 19x |
| 64 | 8x | 9x | 10x | 11x | 12x | 13x | 14x | 15x | 16x | 17x | 18x | 19x | 20x | 21x |
| 128 | 10x | 11x | 12x | 13x | 14x | 15x | 16x | 17x | 18x | 19x | 20x | 21x | 22x | 23x |
| 256 | 12x | 13x | 14x | 15x | 16x | 17x | 18x | 19x | 20x | 21x | 22x | 23x | 24x | 25x |
| 512 | 14x | 15x | 16x | 17x | 18x | 19x | 20x | 21x | 22x | 23x | 24x | 25x | 26x | 27x |
| 1,024 | 16x | 17x | 18x | 19x | 20x | 21x | 22x | 23x | 24x | 25x | 26x | 27x | 28x | 29x |
| 2,048 | 18x | 19x | 20x | 21x | 22x | 23x | 24x | 25x | 26x | 27x | 28x | 29x | 30x | 31x |
| 4,096 | 20x | 21x | 22x | 23x | 24x | 25x | 26x | 27x | 28x | 29x | 30x | 31x | 32x | 33x |
| 8,192 | 22x | 23x | 24x | 25x | 26x | 27x | 28x | 29x | 30x | 31x | 32x | 33x | 34x | 35x |
| 16,384 | 24x | 25x | 26x | 27x | 28x | 29x | 30x | 31x | 32x | 33x | 34x | 35x | 36x | 37x |
| 32,768 | 26x | 27x | 28x | 29x | 30x | 31x | 32x | 33x | 34x | 35x | 36x | 37x | 38x | 39x |
| 65,536 | 28x | 29x | 30x | 31x | 32x | 33x | 34x | 35x | 36x | 37x | 38x | 39x | 40x | 41x |
| 131,072 | 30x | 31x | 32x | 33x | 34x | 35x | 36x | 37x | 38x | 39x | 40x | 41x | 42x | 43x |
| 262,144 | 32x | 33x | 34x | 35x | 36x | 37x | 38x | 39x | 40x | 41x | 42x | 43x | 44x | 45x |
| 524,288 | 34x | 35x | 36x | 37x | 38x | 39x | 40x | 41x | 42x | 43x | 44x | 45x | 46x | 47x |
| 1,048,576 | 36x | 37x | 38x | 39x | 40x | 41x | 42x | 43x | 44x | 45x | 46x | 47x | 48x | 49x |

DATA DENSITY INCREASE OVER NRZI RECORDING

*FIG. 9*

TRIPLE-ATTRIBUTE METHOD OF ENCODING AND DECODING MAGNETIC DATA

FEDERALLY SPONSORED RESEARCH

Not Applicable

SEQUENCE LISTING OR PROGRAM

Not Applicable

BACKGROUND—FIELD

This invention relates generally to magnetic disk data storage systems, and more specifically to a system and method of encoding and decoding a plurality of bits of information into a single write current pulse that is recorded in a bit cell on a magnetic disk medium.

BACKGROUND—PRIOR ART

The continuing trend in magnetic disk data storage systems such as computer hard disk drives (HDDs) is toward smaller, faster and less costly devices with ever-increasing capacity. The remarkable increase in the processing ability of computers in recent years has given rise to sophisticated software programs that require large capacity HDDs to store them.

In addition, disk capacity is increasingly challenged by large video, data, and music files that are now common, and the advent of holographic image files will demand significantly more disk space yet again.

In general, HDDs are comprised of one or more rotating disks with a plurality of evenly-spaced concentric tracks arranged thereon. The disks are rotated by a spindle motor at a substantially constant rate of, typically, several thousand rpm (revolutions per minute). One or more read/write heads hover over the disks and either create magnetic domains in elemental areas called bit cells during write operations, or else detect the magnetic domains previously recorded in the bit cells during read operations.

A major functional element of a magnetic disk data storage system is the data channel, which includes a write channel and a compatible read channel. The write channel receives binary source data from the host, encodes it, and records it as a series of magnetic flux transitions onto one or more disks of the HDD. The read channel retrieves the data from the disks, decodes it, and supplies it back to the host. Encoding and decoding are collectively known as the "ENDEC" function of the data channel.

The efficiency of a given ENDEC is measured by the Code Rate, indicated by the fraction N/M, where N bits of binary source data received from the host are recorded onto a disk utilizing M bit cells. Low code rates (those less than unity, or 1) cause inefficient use of the available disk space, which in turn generally means a high dollar cost per megabyte of storage space. High code rates result in more efficient use of the available disk space with attendant lower cost per megabyte of storage space.

It is an axiom within the computer industry that there is no such thing as enough memory and disk storage space. Consequently, magnetic storage system manufacturers continuously strive to increase the capacity of the disk drives that they produce in order to offer the benefit of lower cost per megabyte of storage space to their customers.

Generally, the capacity of an HDD can be increased in three ways. Firstly, it can be increased by adding disk area, which is done by raising either the number or the diameter of the disks within the HDD unit. However, as the number of disks increases, the rotary drive force of the spindle motor used to rotate them needs to be raised. This introduces the problems of increased power consumption, heat, and noise generated within the HDD. On the other hand, increasing the diameter of the disks results in a physically larger HDD unit. While larger dimensions are a feasible option for disk drives intended for mainframe computers, they are not a viable option for disk drives intended for desktop, laptop, or handheld computers. Cost is also a significant issue when adding disk area.

Secondly, the capacity of an HDD can be increased by raising the recording density of the disks therein. Typically, this is done by increasing the linear bit density and/or the track density. Linear bit density refers to the number of elemental areas (bit cells) arranged per inch on a circular track of the disk, and it is increased by packing the bit cells closer together. However, when this is done, there results the problem of inter-symbol interference causing errors in the readback signal during a read operation. Track density refers to the number of tracks arranged per inch of the disk, as viewed in a radial direction, and it is increased by reducing the width and pitch of individual tracks. However, when the tracks are altered in this way, crosstalk between adjacent tracks becomes a significant problem and readback errors may result. Efforts to increase the recording density of HDDs have been ongoing, requiring very high expense and considerable engineering effort.

Thirdly, the capacity of an HDD can be increased by using a more efficient data encoding and decoding method. Encoding is the process used to convert binary source data received from the host into code data that can be stored on the disk drive. Code data is a series of magnetic flux transitions that occupy the bit cells on a disk and which represent the source data that was received from the host. An efficient encoding method is one in which there are fewer flux transitions occupying the disk than there are data bits received from the host. Several examples of prior art encoding methods are listed in the table below. Encoding methods are often called Codes, Code Types, or Modulation Codes.

TABLE 1

| U.S. Pat. No. | Issue Date | Author(s) | Code Type | Code Rate (N/M) |
|---|---|---|---|---|
| 3,374,475 | Mar. 19, 1968 | Gabor | Gabor | 2/3 |
| 3,685,033 | Aug. 15, 1972 | Srivastava, et al. | GCR 4/5 | 4/5 |
| 4,323,931 | Apr. 06, 1982 | Jacoby, et al. | 3PM | 3/2 |
| 4,488,142 | Dec. 11, 1984 | Franaszek | RLL 1,7 | 2/3 |
| 4,506,252 | Mar. 19, 1985 | Jacoby, et al. | Ternary | 3/2 |
| 5,422,760 | Jun. 06, 1995 | Abbott, et al. | GCR 8/9 | 8/9 |
| 5,631,887 | May 20, 1997 | Hurst, Jr. | PWM | 5/2 |
| 5,818,653 | Oct. 06, 1998 | Park, et al. | QAM/PSK | 8/3 |
| 5,844,507 | Dec. 01, 1998 | Zook | GCR 16/17 | 16/17 |
| 6,032,284 | Feb. 29, 2000 | Bliss | TCM | 8/5 |
| 6,212,230 | Apr. 03, 2001 | Rybicki, et al. | PPM | 8/3 |

It should be noted that codes have several characteristics in addition to code rate that are important to consider when making a determination of a particular code's usefulness. These characteristics are termed Figures of Merit. U.S. Pat. No. 4,928,187 issued May 22, 1990 to Rees discloses the Figures of Merit for several significant codes. Figures of Merit that are considered advantageous are a high data density or code rate, a low frequency ratio, a large recovery window, and a low error propagation distance.

Data density or code rate indicates the relationship between the number of binary source data bits N received from the host, and the number of bit cells M used to represent that data on the disk. A high data density is anything greater than unity, or 1.

The recovery window indicates the time period in which a given bit cell is sampled for valid data. Larger recovery windows reduce the possibility of readback errors. A recovery window bracketing an entire bit cell is most favorable.

The frequency ratio indicates the overall bandwidth requirement of the code under consideration. Frequency ratios of less than two are considered best.

Error propagation is a Figure of Merit that indicates how significantly a misread data bit will affect subsequent data bits read back from the storage medium during a read operation. This Figure of Merit tends to be sacrificed the most in the quest for maximum data density. Error propagation distances of less than two bit cells in duration are considered good.

Attempts have been made to develop modulation codes with progressively better Figures of Merit. Nevertheless, all the encoding methods heretofore known suffer from a number of disadvantages:

(a) Increasing the storage capacity of a magnetic disk storage system commonly requires physical alterations to the magnetic disk medium, read/write heads, or the mechanical interface therebetween. Prior-art alterations include thin-film recording surfaces, flying magneto-resistive read heads, higher disk rotational speeds, voice-coil-driven actuator arms, and smaller magnetic domains. These alterations come at great expense and considerable engineering effort.

(b) Prior-art encoding methods with code rates greater than unity commonly sacrifice other Figures of Merit in order to achieve the greater code rate.

(c) No prior-art encoding methods for magnetic HDDs have a code rate (N/M) greater than 3/1.

(d) Achieving high storage capacity in prior-art HDD designs commonly required using a plurality of disks. These disks are the greatest single expense in an HDD design and using a plurality of them results in a very expensive HDD unit.

(e) To achieve a level of increased performance, magnetic disks are commonly rotated at several thousand rpm, which requires the use of exotic disk materials to prevent the disks from shattering due to the high centrifugal forces generated.

(f) Achieving high storage capacity in prior-art HDD designs commonly required creating a disk drive with a large physical size, resulting in excess material usage, excess cost, and a greater negative impact on the environment.

(g) Achieving high data throughput (bits recorded and retrieved per second) in prior-art disk drives commonly required a high rotational speed. This is another contributor to the requirement of using exotic and expensive disk materials.

(h) There are physical limits to the maximum capacity of prior-art disk drives because of constraints imposed on a drive's physical dimensions.

(i) Increasing bit density has commonly involved simply packing the magnetic bits closer together. But this results in inter-symbol interference (ISI) when the bits exceed a certain proximity limit. This approach also necessitates sensitive read heads and advanced detection schemes to reliably detect the weaker magnetic domains associated with densely packed magnetic bits.

(j) In an effort to maximize total data storage capacity, prior-art HDD encoding methods typically sacrifice bit error rates or channel frequency characteristics in order to achieve the primary goal of maximum storage capacity. However, in systems such as these the overall performance, when taken as a whole, is not improved over other encoding systems of the art.

(k) Encoding methods have become increasingly costly and complex in an effort to pack as much data as possible onto a magnetic disk. Improvements in cost per megabyte have come as a result of mass production rather than as a result of efficient encoding methodologies.

(l) Increasing the storage capacity in prior-art HDDs has almost always been achieved by packing the magnetic bits closer together on the disks. However, this has the undesirable result of increasing the read channel frequency and associated noise of the channel which requires complex compensation methods.

Objectives and Advantages

Accordingly, several objectives and advantages of the present invention are:

(a) To provide a method of increasing the data storage capacity of a magnetic disk storage system without requiring physical alterations to the design of the magnetic disk medium, read/write heads, or the mechanical interface therebetween.

(b) To provide a code rate greater than unity, in which each bit cell on the magnetic disk stores more than one bit of data.

(c) To provide a code rate greater than 3, which exceeds all other magnetic storage system encoding methods.

(d) To provide a cost savings to magnetic storage system manufacturers by enabling more data to be stored on a given disk, requiring fewer disks in a given HDD design.

(e) To provide a cost savings to magnetic storage system manufacturers by enabling the use of cheaper materials for the magnetic disks because they are rotated at a significantly lower speed than is common in the art.

(f) To provide a way to reduce the physical size of an HDD while maintaining high data storage capacity, thereby providing a cost and material savings to magnetic storage system manufacturers, as well as a reduced environmental impact.

(g) To provide a method of increasing the data throughput (bits per second) of an HDD by encoding multiple bits of information into a single bit cell on a magnetic disk, allowing more data to be written to and read from the disk in a given time frame.

(h) To provide a substantially higher capacity HDD than is currently attainable by applying three encoding methods simultaneously to a block of source data so that storage capacity is maximized without exceeding physical dimension constraints.

(i) To provide a method of increasing the storage capacity of an HDD that doesn't necessitate packing the magnetic bits closer together on the disk.

(j) To provide an encoding method with high performance.

(k) To provide an encoding method having low cost/complexity on a per megabyte basis.

(l) To provide an encoding method which promotes greater data density without increasing the read channel frequency or the read channel noise.

(m) To provide an encoding and decoding method with substantially improved Figures of Merit.

(n) To provide an encoding system which improves efficiency and data density through the simultaneous application of three modulation concepts known to other communication fields.

(o) To provide an encoding method which reduces bit error rates by using three modulation concepts so that if one modulation characteristic is decoded incorrectly, the error will not propagate to the remainder of the encoded word, which is represented by other characteristics.

Still further objectives and advantages will become apparent from a consideration of the ensuing description and drawings.

SUMMARY

This invention can be regarded as a method of increasing the quantity of data represented by a single current pulse written to a magnetic disk. Accordingly, what is believed to be new and novel is, in combination, a data encoding and decoding method comprising a mission-dependent look-up table and simultaneous application of Pulse Amplitude, Pulse Width, and Pulse Position modulation schemes to the signals recorded onto a magnetic disk medium.

DRAWINGS

Drawing Figures

In the ensuing drawings, like reference numerals in the several figures denote like elements. In addition, closely related figures and closely related elements have the same number but different alphabetic suffixes.

FIGS. 5A through 5C are illustrations of several example bit cells and data pulses possible with the present invention.

FIGS. 5D and 5E illustrate one example data pulse and the binary source data sequence associated therewith.

FIGS. 6A through 6C show the conversion data used in the look-up tables of the present invention.

FIGS. 8A and 8B illustrate the Figures of Merit for the modulation codes of FIG. 7 and the code of the present invention.

FIG. 9 is a table indicating the data density increases possible with the present invention.

Figure 1:
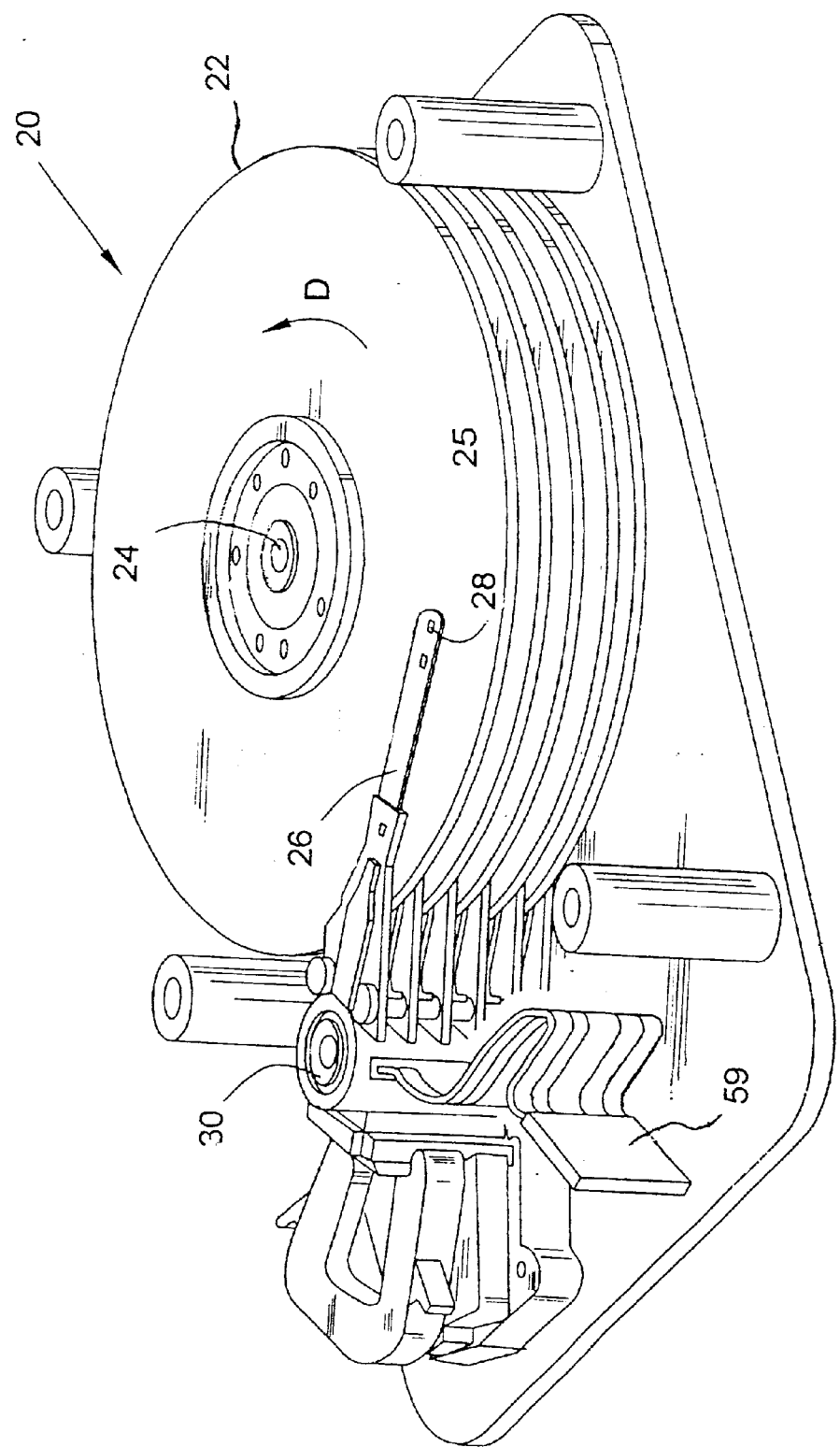
FIG. 1 is an illustration of a high capacity magnetic disk drive of the type improved upon by the present invention.

| Reference Numerals In Drawings | | | |
|---|---|---|---|
| 20 | head disk assembly (HDA) | 22 | disk |
| 24 | drive spindle | 25 | magnetic recording surface |
| 26 | actuator arm | 28 | read/write head |
| 30 | actuator arm rotator | 34 | disk track |
| 35 | stored data sector | 36 | servo wedge |
| 38 | inner recording zone | 39 | outer recording zone |
| 40 | acquisition preamble | 42 | sync mark |
| 44 | stored data | 46 | Error Correction Code bytes |
| 49 | source data $b_{(n)}$ | 54 | TAM encoded data $+b_{(n)}$ |
| 56 | NRZ modulated write symbols $a_{(n)}$ | 58 | write circuitry output path |
| 59 | I/O path | 60 | read circuitry input path |
| 62 | read symbols $\hat{a}_{(n)}$ | 64 | timing feedback path |
| 66 | clock input to write circuitry | 68 | frequency input path to ITR circuit |
| 70 | timing sync path | 72 | SARC data output symbols $+\hat{b}_{(n)}$ |
| 74 | TAM decoded data $\hat{b}_{(n)}$ | 76 | timing reference signal |
| 80 | dividing circuit | 82 | pulse amplitude modulator |
| 84 | pulse width modulator | 86 | pulse position modulator |
| 88 | multiplexer | 91 | data segment $b_{(n1)}$ |
| 92 | data segment $b_{(n2)}$ | 93 | data segment $b_{(n3)}$ |
| 94 | amplitude modulated segment $+b_{(n1)}$ | 95 | pulse width modulated segment $+b_{(n2)}$ |
| 96 | pulse position modulated segment $+b_{(n3)}$ | 99 | error corrected/decoded user data $b_{(n)}$ |
| 100 | modulation look-up table | 101 | demodulation look-up table |
| 102 | TAM encoder | 104 | data generator |
| 106 | NRZ current pulse modulator | 108 | write circuitry |
| 110 | read circuitry | 112 | SARC circuit |
| 114 | ITR circuit | 116 | frequency synthesizer |
| 118 | TAM decoder | 120 | EDAC circuit |
| 125 | channel data rate signal | 130 | combining circuit |
| 132 | pulse amplitude demodulator | 134 | pulse width demodulator |
| 136 | pulse position demodulator | 145 | demultiplexer |
| 146 | pulse amplitude attribute $+\hat{b}_{(n1)}$ | 147 | pulse width attribute $+\hat{b}_{(n2)}$ |
| 148 | pulse position attribute $+\hat{b}_{(n3)}$ | 149 | partial data sequence $\hat{b}_{(n1)}$ |
| 150 | partial data sequence $\hat{b}_{(n2)}$ | 151 | partial data sequence $\hat{b}_{(n3)}$ |
| 160A | reference pulse #1 | 160B | reference pulse #2 |
| 160C | reference pulse #3 | 160D | reference pulse #4 |
| 161A | amplitude increments of bit cell 175A | 161B | amplitude increments of bit cell 175D |
| 164A | leading edge of reference pulse #5 | 164B | leading edge of reference pulse #6 |
| 164C | leading edge of reference pulse #7 | 164D | leading edge of reference pulse #8 |

-continued

Reference Numerals In Drawings

| | | | |
|---|---|---|---|
| 165A | reference pulse #5 | 165B | reference pulse #6 |
| 165C | reference pulse #7 | 165D | reference pulse #8 |
| 166A | trailing edge of reference pulse #5 | 166B | trailing edge of reference pulse #6 |
| 166C | trailing edge of reference pulse #7 | 166D | trailing edge of reference pulse #8 |
| 167 | centerline of bit cell 175D | 168A | BCII of bit cell 175B |
| 168B | BCII of bit cell 175C | 168C | BCII of bit cell 175D |
| 169 | centerline of bit cell 175C | 170A | reference pulse #9 |
| 170B | reference pulse #10 | 170C | reference pulse #11 |
| 170D | reference pulse #12 | 171A | centerline of reference pulse #9 |
| 171B | centerline of reference pulse #10 | 171C | centerline of reference pulse #11 |
| 171D | centerline of reference pulse #12 | 172 | centerline of reference pulse #13 |
| 173 | reference pulse #13 | 175A | example bit cell #1 |
| 175B | example bit cell #2 | 175C | example bit cell #3 |
| 175D | example bit cell #4 | | |

DETAILED DESCRIPTION

FIG. 1 illustrates a head/disk assembly (HDA) 20 of the type used in a preferred embodiment of the present invention. A plurality of disks 22 are stacked in a vertical array and mounted on a common drive spindle 24. The disks 22 rotate counter-clockwise (indicated by arrow D) at a substantially constant rate. In the preferred embodiment, disks 22 rotate at 400 rpm (revolutions per minute), the reasons for which are detailed below. A magnetic recording surface 25 is affixed to both sides (top and bottom) of each disk 22. The recording surface 25 comprises a magnetic thin film medium such as cobalt alloy.

Each recording surface 25 is accessed by a dedicated actuator arm 26 with a distal end carrying a flying read/write head 28. Although FIG. 1 illustrates five disks 22, six actuator arms 26, and six heads 28, it is to be understood that the number of disks 22, arms 26, and heads 28 used in a given implementation of this invention can be any non-negative integer of at least one.

Accordingly, the actuator arms illustrated in FIG. 1 are ganged together at their proximal end and are collectively moved in an arcuate fashion by a rotary actuator assembly 30 to enable read and write operations to be performed upon recording surfaces 25 of disks 22. Data flowing to and from heads 28 passes through an I/O path 59 on the way to and from a host or system bus, such as the system bus of a personal computer (not shown). Disks 22 rotate at a constant rate of 400 rpm so as to provide a generous elapsed time between the passage of successive elemental magnetic areas (bit cells) under heads 28.

In the preferred embodiment, the rotation rate of 400 rpm provides a 30,720 picosecond elapsed time between bit cells. This time period brackets a plurality of possible locations at which leading and trailing edges of a data pulse may occur. The period between each of the plurality of possible locations will be called bit cell increment resolution (BCIR). In the preferred embodiment, the BCIR is 120 picoseconds. In other embodiments, the BCIR can be any non-negative number of at least 0.02 picoseconds.

Figures 2A, 2B:
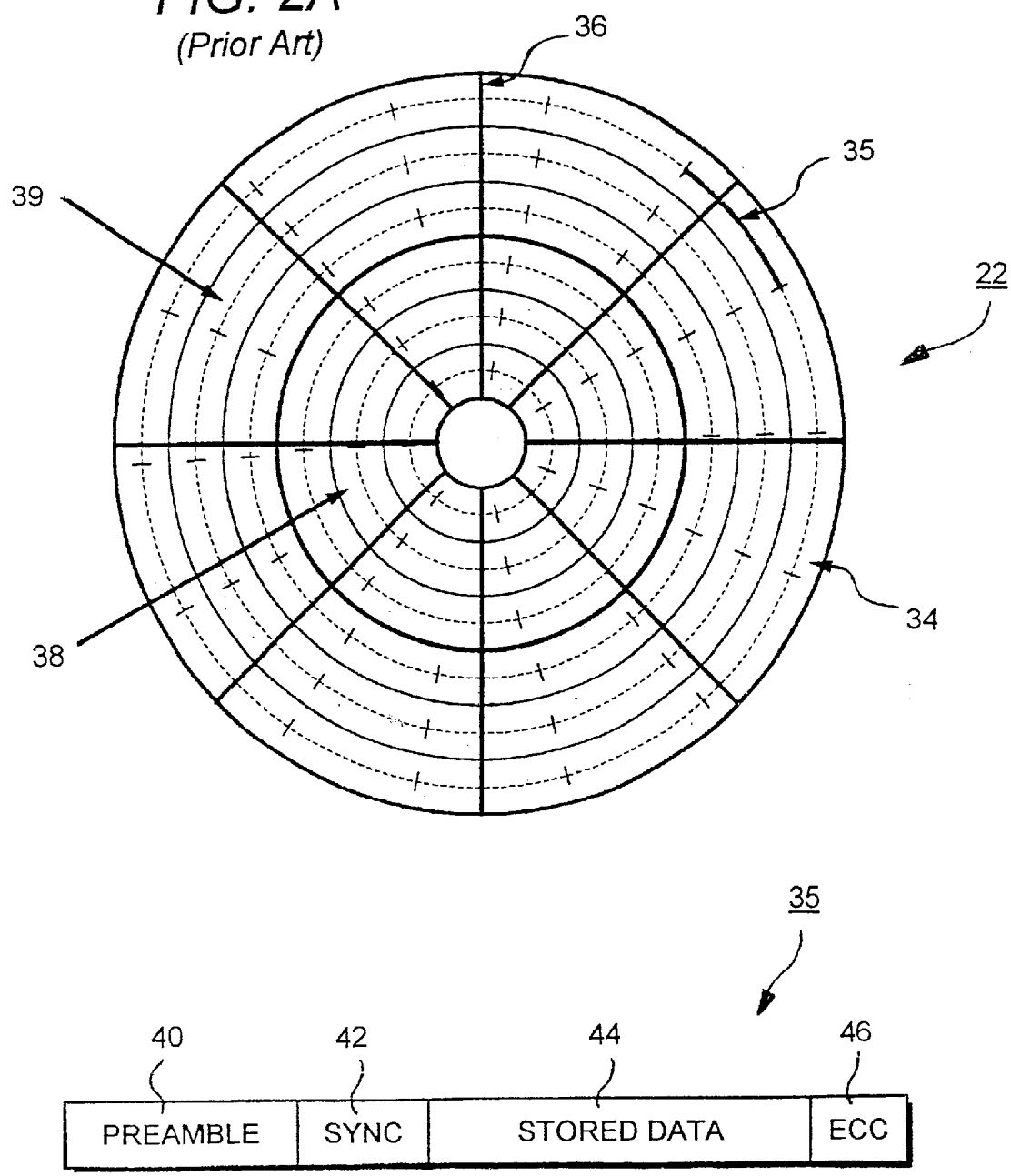
FIG. 2A is an illustration of the data format for a magnetic disk of the type utilized in the present invention.
FIG. 2B shows an exemplary format of a stored data sector.

FIG. 2A illustrates the data format of one of the disks 22 with a plurality of concentric tracks 34 thereon. Tracks 34 are comprised of a plurality of stored data sectors 35 and a predetermined number of servo wedges 36. Servo wedges 36 provide position error signals (PES) to a conventional disk drive controller (not shown) so that heads 28 will be positioned in the correct location over disks 22 for read and write operations. Servo wedges typically include preamble- .and synchronization (sync mark) bytes in addition to the PES marks.

FIG. 2B illustrates the format of one of the plurality of stored data sectors 35. Sectors 35 are comprised of an acquisition preamble 40, a sync mark 42, a stored data field 44, and a predetermined number of error correction code (ECC) bytes 46. The acquisition preamble 40 is processed by the disk drive controller to acquire the correct data sampling parameters before reading stored data 44. Sync mark 42 demarks the beginning of stored data 44, which typically comprises 512 bytes (4,096 bits) of data. Following stored data 44 is the ECC byte field 46. ECC bytes are mathematically generated and appended to stored data 44 so that errors can be detected and corrected upon readback from HDA 20.

An inner recording zone 38 and an outer recording zone 39 exemplify the plurality of circumferential zones that disks 22 can be partitioned into. Circumferential zones take advantage of the additional recording area that becomes available as heads 28 move from the inner diameter of disk 22 to the outer diameter. Accordingly, disk 22 is partitioned into the inner recording zone 38, and the outer recording zone 39. Inner zone 38 is comprised of 7 sectors per track, and outer zone 39 is comprised of 14 sectors per track. In practice, magnetic disks are typically partitioned into many recording zones, sometimes as many zones as there are tracks. The present invention is operable with any number of recording zones.

Figure 3:
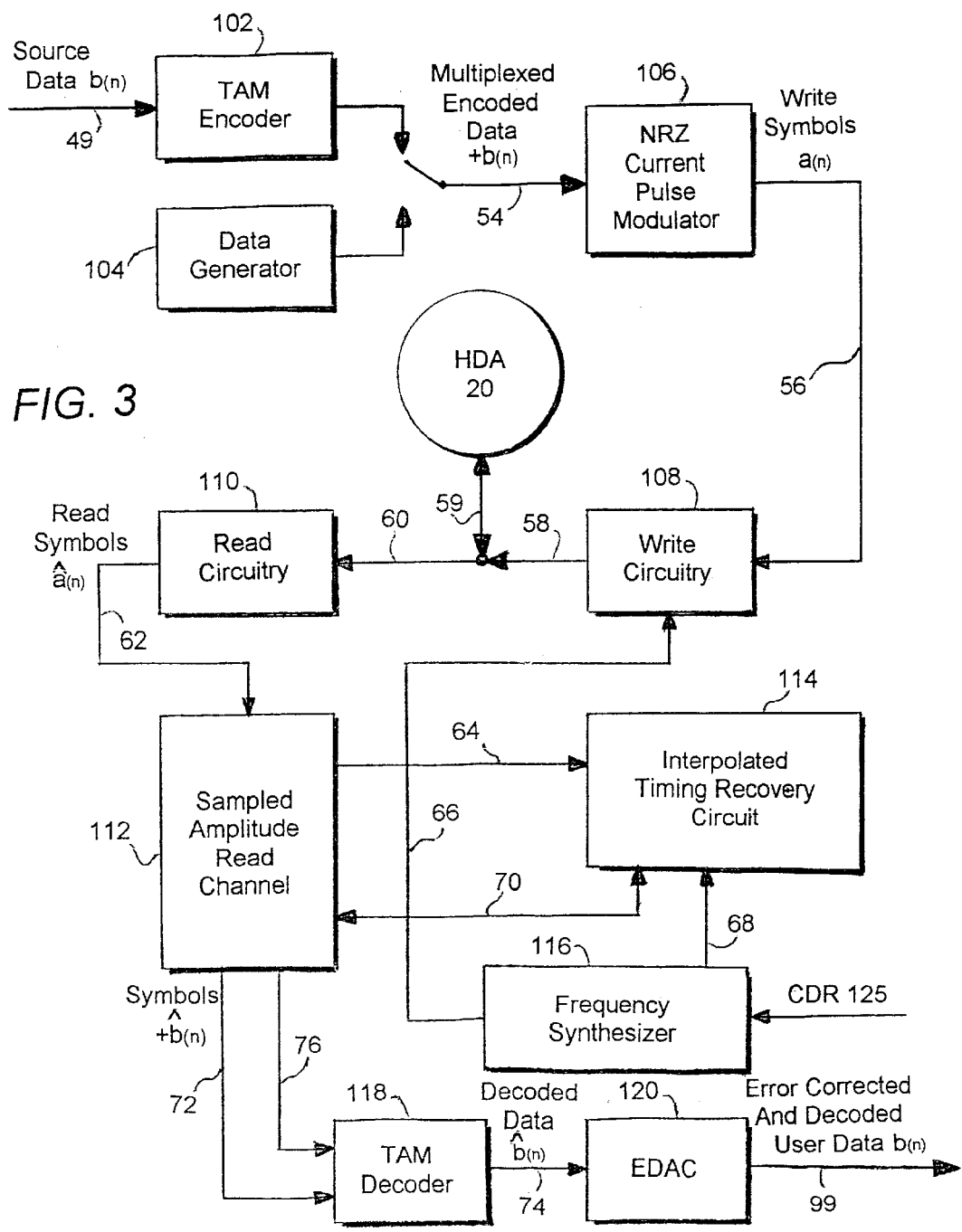
FIG. 3 is a block diagram of the data channel of the present invention.

FIG. 3 illustrates the data channel layout of the preferred embodiment of the present invention. During a write operation, preamble data 40 and sync mark 42 from a data generator 104, followed by a source data sequence 49 and ECC bytes 46 are written to HDA 20. Source data 49 enters Triple-Attribute Method (TAM) encoder 102 where it is encoded as a series of data symbols $+b_{(n)}$ 54 according to a mission-dependent modulation look-up table 100, the preferred embodiment of which is illustrated in FIGS. 4A and 6A through 6C.

Symbols $+b_{(n)}$ 54 output from TAM encoder 102 are converted into write symbols $a_{(n)}$ 56 by a Non-Return to Zero (NRZ) current pulse modulator 106. Write circuitry 108, responsive to the symbols $a_{(n)}$ 56, modulates the current in the recording portion of read/write head 28 (FIG. 1) at a predetermined baud rate 1/T for the current recording zone. The signals from write circuitry 108 are input to HDA 20 over a write circuitry output 58 and I/O path 59. The write symbols $a_{(n)}$ 56 generated by NRZ modulator 106 have varying pulse widths, positions, and amplitudes representative of the source data 49 which is to be stored on HDA 20.

During a read operation, magnetic pulses are sensed by the read portion of head 28 and are provided in raw form to read circuitry 110 through I/O path 59 and read circuitry input path 60. Read circuitry 110 amplifies the raw signals and outputs them as read symbols $\hat{a}_{(n)}$ 62 to a Sampled Amplitude Read Channel (SARC) 112. SARC 112 is preferably a Maximum Likelihood Sequence Detection (MLSD) system such as that disclosed in U.S. Pat. No. 5,638,065 issued Jun. 10, 1997 to Hassner, et al., or an asynchronously-sampled read channel such as that disclosed in U.S. Pat. No. 5,293,369 issued Mar. 8, 1994 to Melas, et al. However, a wide variety of read channel designs are known in the art and may be used without limiting the present invention.

An Interpolated Timing Recovery (ITR) circuit 114 is used in conjunction with SARC 112 in order to render maximum precision and minimum bit error rates to the data pulses read from HDA 20 during a read operation. ITR circuit 114 and SARC 112 communicate over a feedback path 64 and a sync path 70. Interpolated Timing Recovery circuits are exemplified by U.S. Pat. No. 5,696,639 issued Dec. 9, 1997 to Spurbeck, et al. However, a wide variety of timing recovery circuit designs are known in the art and may be used without limiting the present invention. SARC 112 outputs data symbols +$\hat{b}_{(n)}$ 72 and a timing reference signal 76 to Triple-Attribute Method (TAM) decoder 118.

TAM decoder 118 receives data symbols +$\hat{b}_{(n)}$ 72 and decodes them into decoded data $\hat{b}_{(n)}$ according to a mission-dependent look-up table 101, the preferred embodiment of which is illustrated in FIGS. 4B and 6A through 6C.

A frequency synthesizer 116 provides a course center frequency setting to ITR circuit 114 over a path 68 in order to center the frequency of a Variable Frequency Oscillator (VFO), or equivalent (not shown), over temperature, voltage, and process variations. The frequency range of frequency synthesizer 116 is adjusted by a Channel Data Rate (CDR) signal 125 according to the data rate for the current recording zone that read/write head 28 is over.

Frequency synthesizer 116 also provides a clock signal 66 to write circuitry 108 to maintain precise timing and reduce bit error rates upon readback of the data pulses recorded onto HDA 20. In the preferred embodiment, clock signal 66 occurs at 120 picosecond intervals. In other embodiments, clock signal 66 occurs at regular intervals of at least 0.005 picoseconds.

The data symbols +$\hat{b}_{(n)}$ 72 output from SARC 112 to TAM decoder 118 are decoded according to look-up table 101 and then output to a byte-oriented Error Detection and Correction (EDAC) circuit 120 which mathematically processes the ECC byte field 46 (FIG. 2B) to detect and correct errors. EDAC 120 outputs a corrected decoded user data stream $b_{(n)}$ 99 to the host system. EDAC 120 can be any of a variety of error correction circuits, such as that disclosed in U.S. Pat. No. 5,844,507 issued Dec. 1, 1998 to Zook. However, the choice of EDAC is a design criteria based on the performance desired from the system and is not a limitation of the present invention.

Figure 4A:
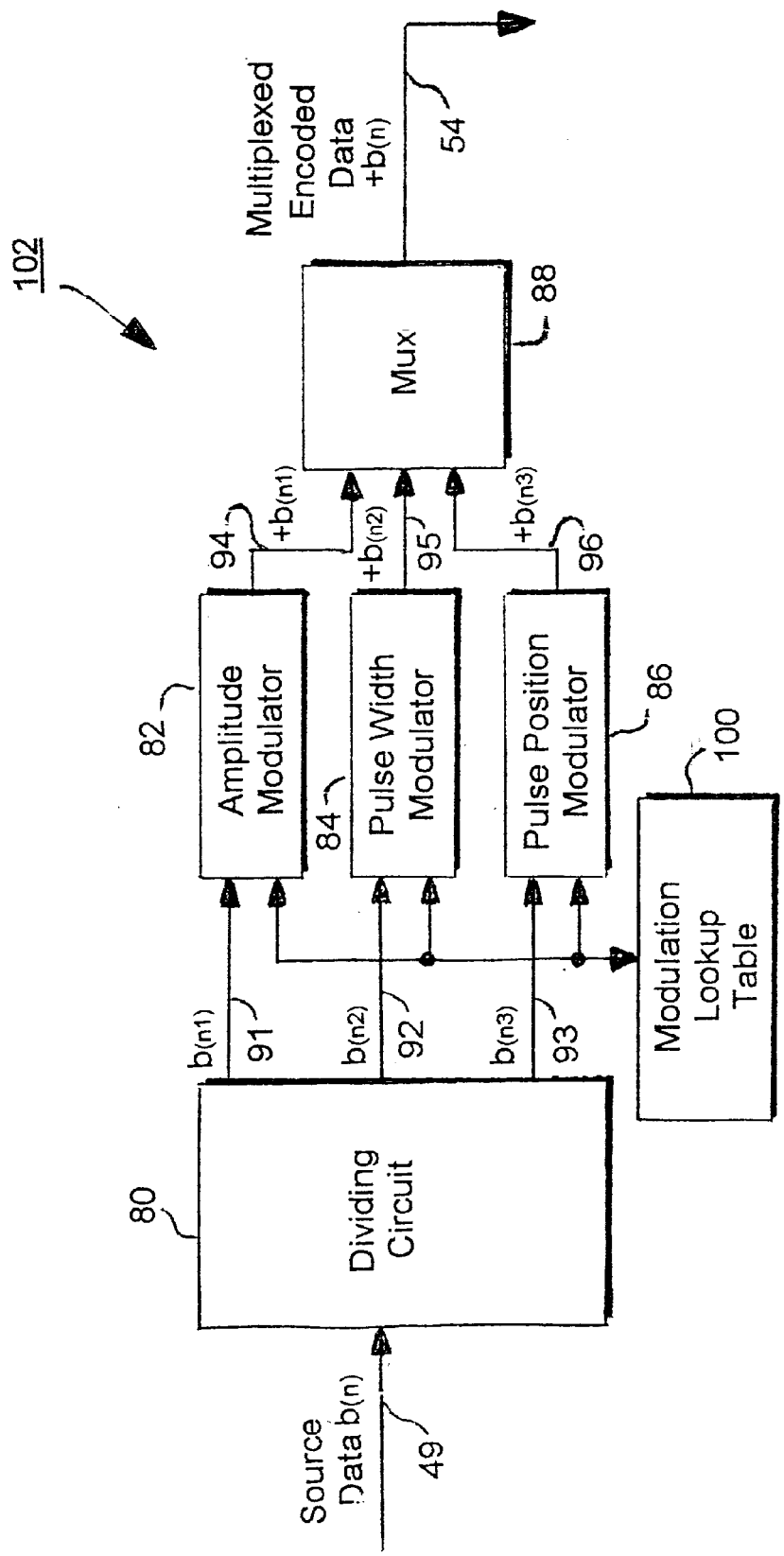
FIG. 4A is a block diagram of the triple-attribute encoder of the present invention.

FIG. 4A illustrates the logic of TAM encoder 102. Source data 49 is received by a dividing circuit 80 where it is separated into a first divided data segment 91, a second divided data segment 92, and a third divided data segment 93. In the preferred embodiment, the first divided data segment 91 comprises four bits, the second divided data segment 92 comprises six bits, and the third divided data segment 93 comprises six bits. In other embodiments, divided data segments 91, 92 and 93 comprise any non-negative number of bits.

Data segment 91 is received by an amplitude modulator 82 and compared to look-up table 100. Amplitude modulator 82 uses the information in table 100 to generate an amplitude modulated segment 94 which is output to a multiplexer 88. Simultaneously, data segment 92 is received by a pulse width modulator 84 and compared to table 100. Modulator 84 uses the information in table 100 to generate a pulse width modulated segment 95 which is output to multiplexer 88. Further simultaneously, data segment 93 is received by a pulse position modulator 86, is compared to table 100, and is used to generate a pulse position modulated segment 96 which is output to multiplexer 88.

Multiplexer 88 combines segments 94, 95 and 96 and outputs data symbol +$b_{(n)}$ 54 instructing NRZ modulator 106 to generate a triple attribute current pulse representative of the original source data 49. The current pulses generated by NRZ modulator 106 have amplitudes, pulse widths, and pulse positions that vary according to the values assigned to a particular sequence of source data $b_{(n)}$ 49 in look-up table 100.

A variety of circuit designs for multiplexer 88, dividing circuit 80, and modulators 82, 84 and 86 are well known to those skilled in the art and need not be reiterated here. In addition, the specific choice of circuits or circuitry modules is a design criteria based on the performance desired from the system and is not a limitation of the present invention.

Figure 4B:
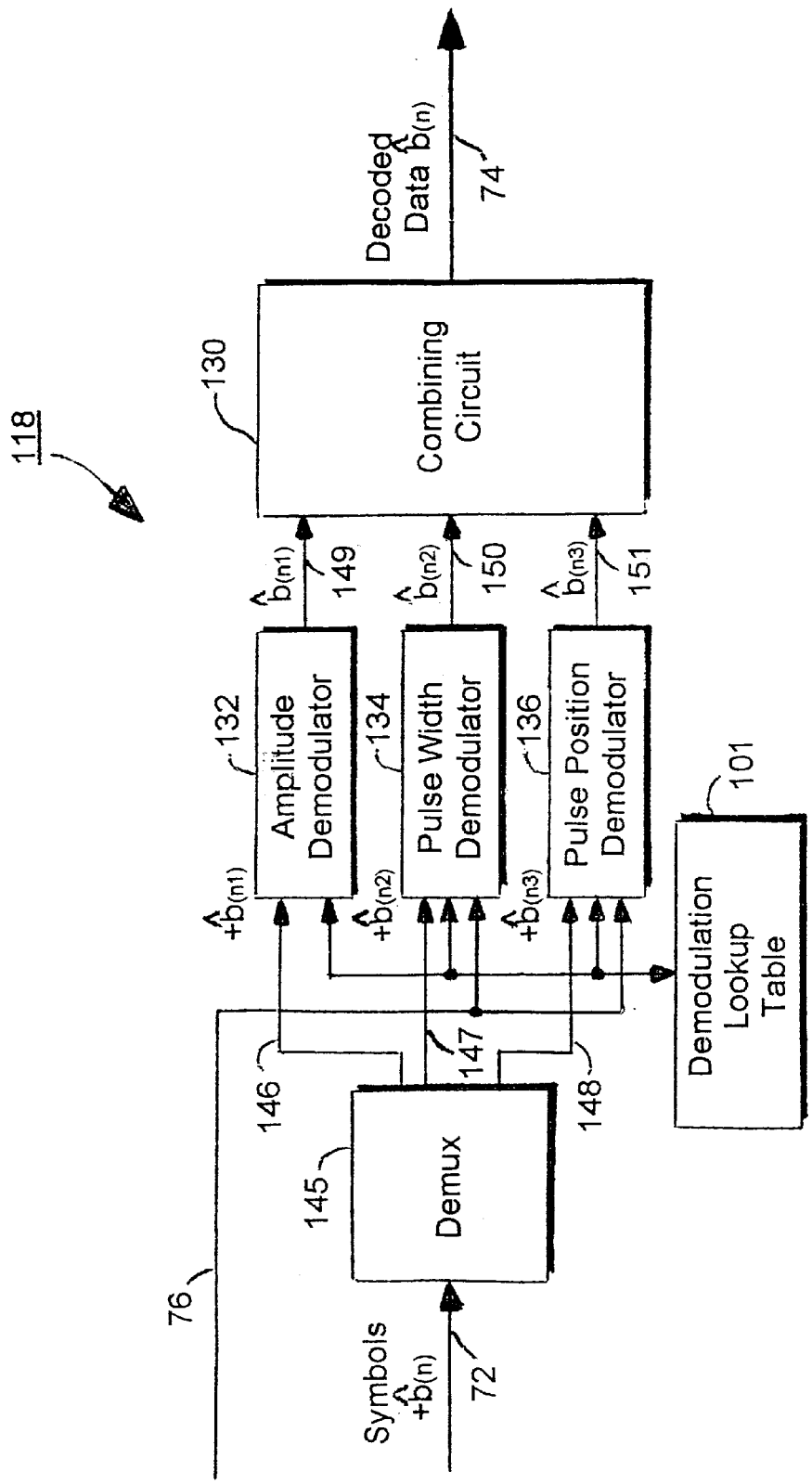
FIG. 4B is a block diagram of the triple-attribute decoder of the present invention.

FIG. 4B illustrates the logic of TAM decoder 118. Data symbols +$\hat{b}_{(n)}$ 72 are received by a demultiplexer 145. Demultiplexer 145 outputs an amplitude attribute +$\hat{b}_{(n1)}$ 146 to a pulse amplitude demodulator 132. In addition, demultiplexer 145 outputs a pulse width attribute +$\hat{b}_{(n2)}$ 147 to a pulse width demodulator 134. Furthermore, demultiplexer 145 outputs a pulse position attribute +$\hat{b}_{(n3)}$ 148 to a pulse position demodulator 136.

Pulse amplitude demodulator 132 compares the pulse amplitude attribute +$\hat{b}_{(n1)}$ 146 to information in a demodulation look-up table 101 and outputs partial data sequence $\hat{b}_{(n1)}$ 149 to a combining circuit 130. In addition, pulse width demodulator 134 compares the pulse width attribute +$\hat{b}_{(n2)}$ 147 to a timing signal 76 and to information in table 101, and outputs partial data sequence $\hat{b}_{(n2)}$ 150 to combining circuit 130. Furthermore, pulse position demodulator 136 compares the pulse position attribute +$\hat{b}_{(n3)}$ 148 to timing signal 76 and to information in table 101 and outputs partial data sequence $\hat{b}_{(n3)}$ 151 to combining circuit 130. Circuit 130 combines partial data sequences 149, 150 and 151 into a complete decoded data string $\hat{b}_{(n)}$ 74.

A variety of circuit designs for demultiplexer 145, combining circuit 130, and demodulators 132, 134 and 136 are known to those skilled in the art, and need not be reiterated here. In addition, the specific choice of circuits or circuitry modules is a design criteria based on the performance desired from the system and is not a limitation of the present invention.

Figure 5A:
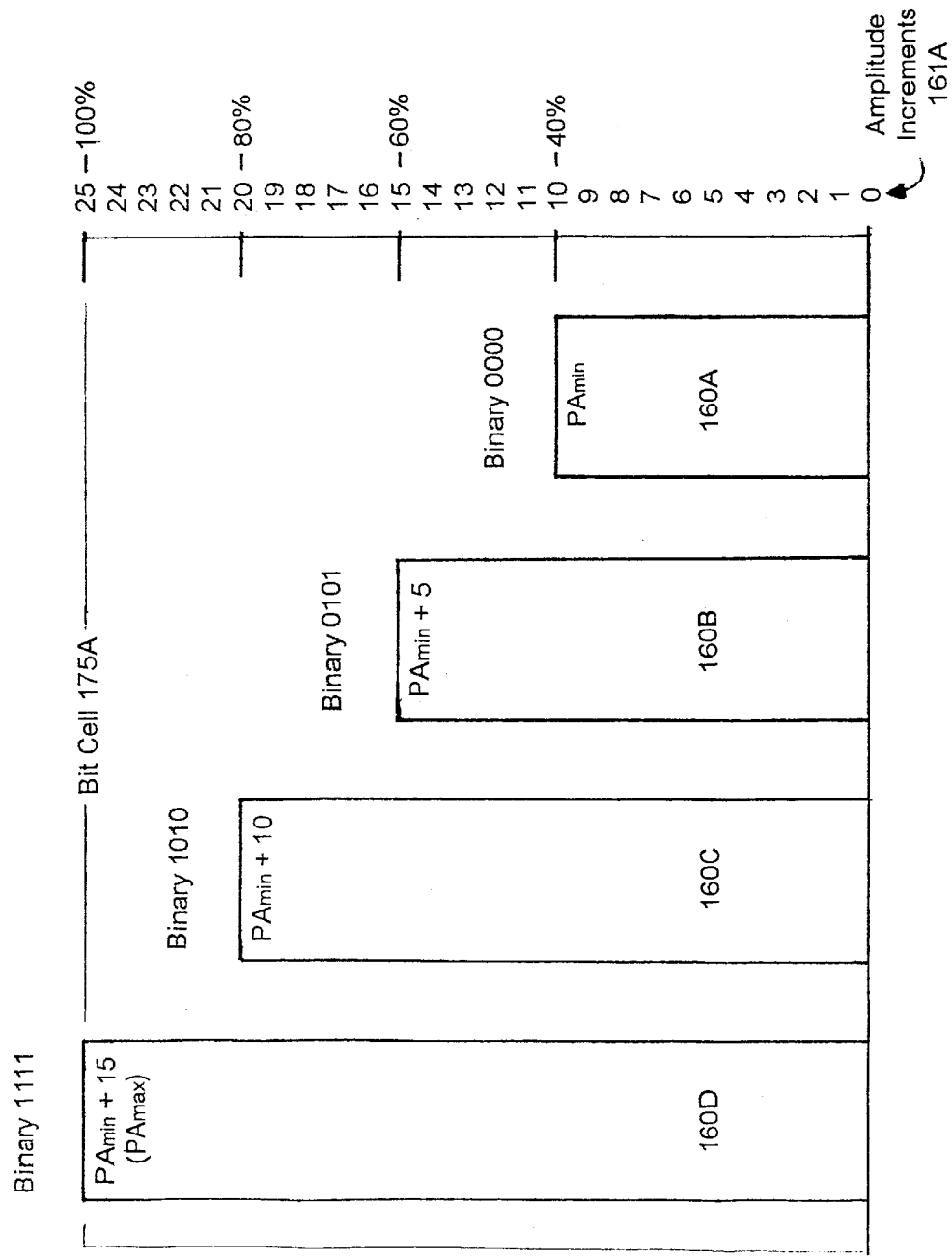

FIG. 5A illustrates several possible data pulse amplitudes as exemplified by reference pulses 160A through 160D of example bit cell 175A. In the preferred embodiment of the present invention, bit cell 175A is divided into 25 amplitude increments 161A. The tenth increment 161A is the minimum permissible amplitude ($PA_{min}$), and the twenty-fifth increment 161A is the maximum permissible amplitude ($PA_{max}$). Data is defined by the distance between $PA_{min}$ and the amplitude of the stored data pulse.

Pulse 160A is shown at $PA_{min}$, or the tenth increment 161A, which is 40 percent of maximum amplitude. The binary value of pulse 160A is 0000. Pulse 160B is shown at $PA_{min.plus}5$, or the fifteenth increment 161A, which is 60 percent of maximum amplitude. The binary value of pulse 160B is 0101. Pulse 160C is shown at $PA_{min.plus}.10$, or the twentieth increment 161A, which is 80 percent of maximum amplitude. The binary value of pulse 160C is 1010. Pulse 160D is shown at $PA_{min.plus}.15$, or the twenty-fifth increment 161A ($PA_{max}$), which is 100 percent of maximum amplitude. The binary value of pulse 160D is 1111.

FIG. 5B illustrates several possible data pulse widths as exemplified by reference pulses 165A through 165D of example bit cell 175B. Reference pulses 165A through 165D have leading edges 164A through 164D and trailing edges 166A through 166D, respectively. In the preferred embodiment of the present invention, bit cell 175B is divided into 256 bit cell internal increments (BCII) 168A. Increments 168A occur at a bit cell increment resolution (BCIR) of 120 picoseconds of separation between increments. Information is defined by the separation between the leading and trailing edges of the stored data pulse. A separation of 128 increments is the minimum permissible pulse width ($PW_{min}$), and a separation of 191 increments is the maximum permissible pulse width ($PW_{max}$).

Pulse 165A is shown at $PW_{min}$, with a separation between leading edge 164A and trailing edge 166A of 128 increments. This corresponds to a pulse duration of 15,360 picoseconds. The binary value of pulse 165A is 000000. Pulse 165B is shown at $PW_{min.plus}.21$, with a separation between leading edge 164B and trailing edge 166B of 149 increments. This corresponds to a pulse duration of 17,880 picoseconds. The binary value of pulse 165B is 010101. Pulse 165C is shown at $PW_{min}.plus.42$, with a separation between leading edge 164C and trailing edge 166C of 170 increments. This corresponds to a pulse duration of 20,400 picoseconds. The binary value of pulse 165C is 101010. Pulse 165D is shown at $PW_{min.plus}.63$, or $PW_{max}$, with a separation between leading edge 164D and trailing edge 166D of 191 increments. This corresponds to a pulse duration of 22,920 picoseconds. The binary value of pulse 165D is 111111.

FIG. 5C illustrates several possible data pulse positions, as exemplified by reference pulses 170A through 170D of example bit cell 175C. Reference pulses 170A through 170D have centerlines 171A through 171D, respectively, and are all shown at maximum pulse width $PW_{max}$ (explained in FIG. 5B above). In the preferred embodiment of the present invention, bit cell 175C is divided into 256 bit cell internal increments (BCII) 168B. Increments 168B occur at a BCIR of 120 picoseconds. Data is defined by the separation between the centerline 169 of bit cell 175C and the centerline of the stored data pulse. The minimum pulse position ($PP_{min}$) is a pulse centerline separation or offset of 32 increments prior to the arrival of bit cell centerline 169 under read/write head 28 (FIG. 1). This corresponds to a time differential of 3,840 picoseconds. The maximum pulse position ($PP_{max}$) is a pulse centerline offset of 31 increments (3,720 picoseconds) after the arrival of bit cell centerline 169.

Pulse 170A, having centerline 171A, is shown at the minimum pulse position ($PP_{min}$). The binary value of pulse 170A is 000000. Pulse 170B, having centerline 171B, is shown at $PP_{min.plus}.14$, corresponding to an offset of 18 increments or 2,160 picoseconds prior to the arrival of bit cell centerline 169. The binary value of pulse 170B is 001110. Pulse 170C, having centerline 171C, is shown at $PP_{min.plus}.52$, corresponding to an offset of 20 increments or 2,400 picoseconds after the arrival of bit cell centerline 169. The binary value of pulse 170C is 10100. Pulse 170D, having centerline 171D, is shown at $PP_{min.plus}.63$, or $PP_{max}$, corresponding to an offset of 31 increments or 3,720 picoseconds after the arrival of bit cell centerline 169. The binary value of pulse 170D is 111111.

Figure 5D:
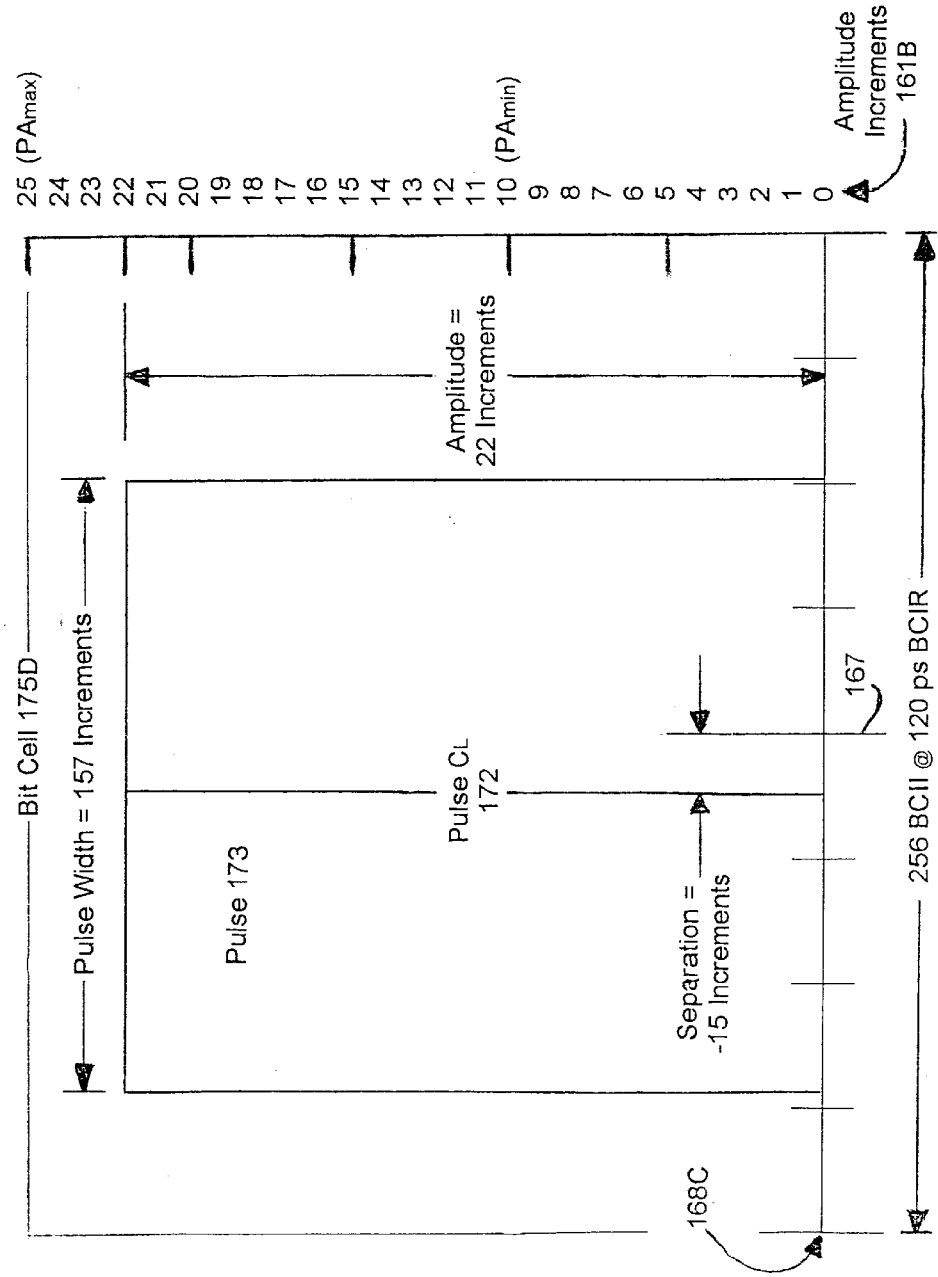

FIGS. 5D and 5E illustrate a binary source data sequence 49 and a reference pulse 173 corresponding thereto. In the preferred embodiment, bit cell 175D is divided into 25 amplitude increments 161B and 256 bit cell internal increments 168C with a BCIR of 120 picoseconds of separation. The binary source data sequence 49 is divided and encoded by the inventive TAM encoder 102 (FIG. 3).

As a result, the first divided data segment 91 (binary 1100), with a decimal value of 12, is encoded as the amplitude of pulse 173. The amplitude is determined by adding the decimal value of 12 to $PA_{min}$, which results in a total amplitude of 22 increments 161B. In addition, the second divided data segment 92 (binary 011101), with a decimal value of 29, is encoded as the pulse width of pulse 173. The pulse width is determined by adding the decimal value of 29 to $PW_{min}$, which results in a total pulse width of 157 increments 168C. Furthermore, the third divided data segment 93 (binary 010001), with a decimal value of 17, is encoded as the position of pulse 173 within the bit cell 175D. The pulse position is determined by adding the decimal value of 17 to $PP_{min}$, which results in a data pulse centerline separation of 15 increments 168C prior to the arrival of bit cell centerline 167 of bit cell 175D.

FIG. 6A illustrates a conversion table useful in the preferred embodiment of the present invention for converting between four binary digits and a corresponding data pulse amplitude. The conversion formula is $b_{(n).plus}.PA_{min.equals}.PAI$; $PAI_{.times}.4_{.equals}.\%$ MaxAmplitude. PAI is the value of the pulse amplitude increments, in units of 4 percent of maximum. $PA_{min}$ is 10 increments, or 40 percent of maximum amplitude.

FIG. 6B illustrates a conversion table useful in the preferred embodiment of the present invention for converting between six binary digits and a corresponding data pulse width. The conversion formula is $b_{(n).plus}.PW_{min.equals}.PWI$; $PWI_{.times}.120_{.equals}.$PulseWidth (duration) in picoseconds. PWI is the value of the pulse width increments, in units of BCIR. $PW_{min}$ is 128 increments, or 15,360 picoseconds of separation between the leading and trailing edges of the pulse.

FIG. 6C illustrates a conversion table useful in the preferred embodiment of the present invention for converting between six binary digits and a corresponding data pulse offset from bit cell centerline. The offset will be a negative number for a data pulse that has a centerline that arrives prior to the bit cell centerline, and a positive number for a data pulse centerline that arrives after the bit cell centerline. The conversion formula is $b_{(n).minus}.32_{.equals}.PPI$; $PPI_{.times}.120_{.equals}.$PulsePosition (offset from bit cell centerline) in picoseconds. PPI is the value of the pulse position increments, in units of BCIR. $PP_{min}$ is −32 increments, or an offset of 3,840 picoseconds in advance of the bit cell centerline.

Figure 7:
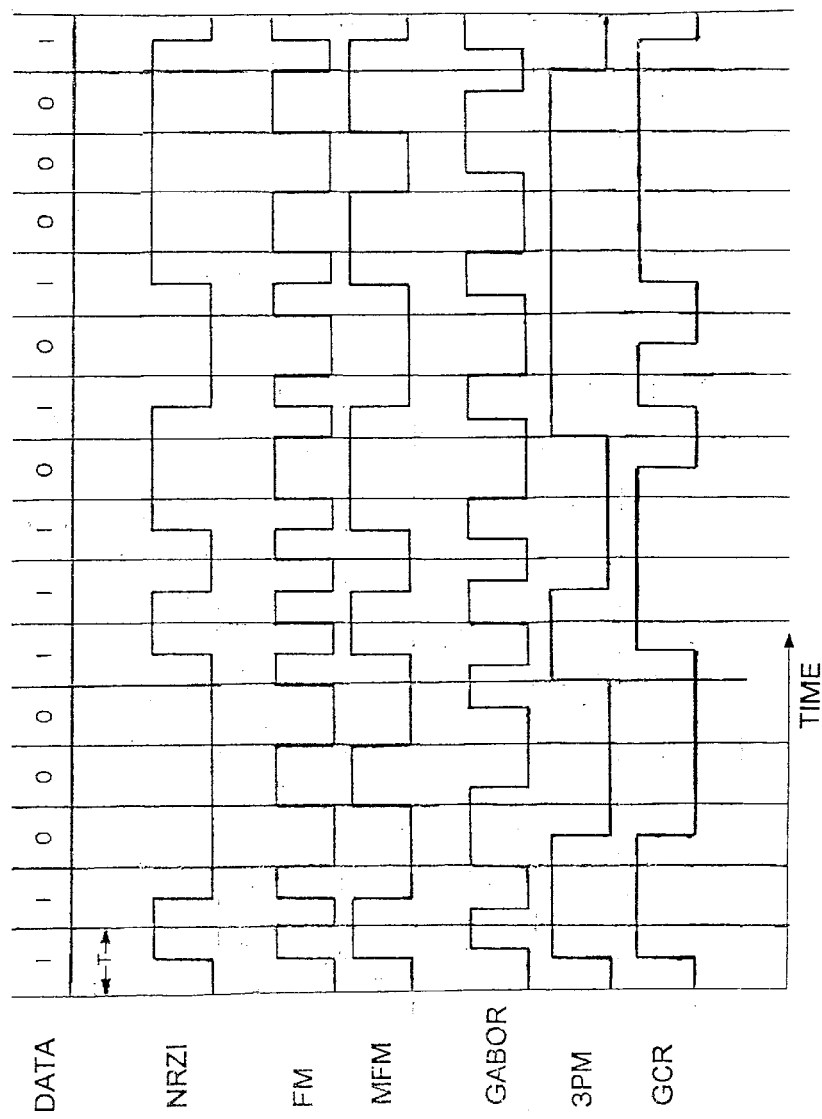
FIG. 7 is an illustration of several prior-art encoded signal waveforms which correspond to the exemplary binary source data sequence of FIG. 5E.

FIG. 7 is a comparison of several encoded signal waveforms known in the art. The binary source data 1100011101010001 is the same data string as that used in FIGS. 5D and 5E of the present invention.

FIG. 8A is a chart of Figures of Merit for the codes illustrated in FIG. 7. An explanation of the terms used in the chart follows:

T=Duration of one bit cell

N=Number of source data bits

M=Number of bit cells used to record the N bits $S_{min}$ = Minimum distance between recorded flux transitions $S_{max}$ = Maximum distance between recorded flux transitions FR = Frequency ratio ($S_{max}/S_{min}$)

D = Density, or code rate (N/M)

RW = Recovery window, in units of T

EPD = Error propagation distance, in units of T

BW = Bandwidth required by the code, in megahertz (Mhz)

FIG. 8B is a chart of Figures of Merit for the TAM code of the preferred embodiment of the present invention. A comparison of Figures of Merit will indicate the value of the inventive TAM code relative to the prior-art codes. In addition to a high density (D), a valuable code will have a low frequency ratio (FR), a large recovery window (RW), a low error propagation distance (EPD) and a low bandwidth requirement (BW).

FIG. 9 shows the data density increase over standard 1/1 (N/M) NRZI encoding that results from a pairing of BCII and amplitude increments. For simplicity, the table assumes an equality between the possible pulse width increments and the possible pulse position increments, with each having possible increments numbering ¼ of the BCII.

Advantages

From the description above, a number of advantages of the triple-attribute method (TAM) of encoding become evident:

(a) A substantial data density increase will result from encoding a write signal with three attributes simultaneously. Each attribute represents a plurality of bits of information, and a plurality of attributes greatly increases the bit representation of a single current pulse written to the recording medium.

(b) The inventive TAM encoding method enables more data to be written to a magnetic disk in a given time frame (throughput), enabling the disk to be rotated at a lower rpm to reduce bandwidth requirements while maintaining an excellent throughput.

(c) The reduced bandwidth requirement of TAM encoding reduces high-frequency noise and increases the signal-to-noise ratio, which reduces the likelihood of encountering errors when reading the data from the disk.

(d) A lower disk rotating speed allows cheaper materials to be utilized in the construction of the disks, providing a cost savings to manufacturers.

(e) A greater data density enables disk drives to be constructed with fewer disks and other parts. This provides a cost and material savings and promotes a healthier environment due to fewer parts ultimately ending up in landfills.

(f) The inventive TAM encoding method embodies excellent Figures of Merit, particularly providing a high data density without sacrificing the frequency ratio, recovery window, error propagation distance, or bandwidth requirement.

Operation—FIGS. 3, 4

The manner of using the present invention involves inputting a block of source data 49 into TAM encoder 102 where it is divided into first, second and third divided data segments 91, 92 and 93, respectively. Segment $b_{(n1)}$ 91 is modulated by amplitude modulator 82 according to conversion parameters in look-up table 100. The modulated segment +$b_{(n1)}$ 94 is output to multiplexer 88. Segment $b_{(n2)}$ 92 is modulated by pulse width modulator 84 according to conversion parameters in look-up table 100. The modulated segment +$b_{(n2)}$ 95 is output to multiplexer 88. Segment $b_{(n3)}$ 93 is modulated by pulse position modulator 86 according to conversion parameters in look-up table 100. The modulated segment +$b_{(n3)}$ 96 is output to multiplexer 88.

Multiplexer 88 receives modulated segments 94, 95 and 96 and multiplexes them into a multiplexed encoded data symbol +$b_{(n)}$ 54 which is output to NRZ current pulse modulator 106. Modulator 106 produces write symbols $a_{(n)}$ 56 which drive write circuitry 108 and ultimately result in flux transitions being applied to one of the disks of HDA 20.

Decoding involves reading the flux transitions from HDA 20 by read circuitry 110. The read symbols $\hat{a}_{(n)}$ 62 are acquired by sampled amplitude read channel 112. Channel 112, operating in conjunction with interpolated timing recovery circuit 114, outputs data symbols +$\hat{b}_{(n)}$ 72 and timing reference signal 76 to TAM decoder 118.

TAM decoder 118 first receives data symbols +$\hat{b}_{(n)}$ 72 into demultiplexer 145. Demultiplexer 145 performs demultiplexing of symbols 72 and outputs the constituent attributes 146, 147 and 148. Attribute +$\hat{b}_{(n1)}$ 146 enters amplitude demodulator 132 and is demodulated according to conversion parameters in look-up table 101. Amplitude demodulator then outputs partial data sequence $\hat{b}_{(n1)}$ 149 to combining circuit 130. Attribute +$\hat{b}_{(n2)}$ 147 enters pulse width demodulator 134 and is demodulated according to conversion parameters in look-up table 101. Pulse width demodulator 134 then outputs partial data sequence $\hat{b}_{(n2)}$ 150 to combining circuit 130. Attribute +$\hat{b}_{(n3)}$ 148 enters pulse position demodulator 136 and is demodulated according to conversion parameters in look-up table 101. Pulse position demodulator 136 then outputs partial data sequence $\hat{b}_{(n3)}$ 151 to combining circuit 130.

Combining circuit 130 receives partial data sequences 149, 150 and 151, and assembles them into a complete block of decoded data 74 which is output to a conventional error detection and correction circuit 120 for processing before being returned to the host system.

Conclusion, Ramifications, and Scope

Accordingly, the reader will see that the triple-attribute method of encoding of this invention provides a substantial data density increase for magnetic disk data storage systems. With a lower disk rotating speed, the bandwidth requirement of this invention is greatly reduced without degrading the data throughput. Fewer materials are needed to build a high capacity disk drive utilizing TAM encoding, providing a cost savings to manufacturers and promoting a healthier environment. Furthermore, the inventive TAM encoding has further additional advantages in that:

(a) It permits disk drives to be built that are substantially smaller than existing drives of similar capacity;

(b) It permits an assortment of look-up tables to be utilized, including matrix-based look-up tables, depending on the data density desired from the system;

(c) It possesses excellent Figures of Merit and does not sacrifice any one Figure for another;

(d) It provides excellent throughput in that more data bits are recorded onto and read back from the disk medium in a given time frame; and (e) The inventive technology provides an avenue of growth so that terabyte-sized multimedia files can be accommodated in the future in a disk drive of standard physical proportions.

Although the description above contains many specificities, these should not be construed as limiting the scope of this invention but as merely providing illustrations of some of the presently preferred embodiments thereof.

Thus the scope of this invention should be determined by the appended claims and their legal equivalents, rather than by the examples given.

I claim:

1. A method of encoding and decoding digital data intended for storage on a magnetic disk medium, comprising:

(a) providing a divider means which is operable to receive a binary source data sequence and divide it into a first divided data segment, a second divided data segment, and a third divided data segment, wherein:
  (1) said binary source data sequence comprises a predetermined number of source data bits, and
  (2) said first divided data segment comprises a first predetermined number of divided data bits, and
  (3) said second divided data segment comprises a second predetermined number of divided data bits, and
  (4) said third divided data segment comprises a third predetermined number of divided data bits, (b) providing a mission-dependent modulation look-up table, wherein:
  (1) said mission-dependent modulation look-up table indicates a first modulation value corresponding to the binary value of said first divided data segment, and
  (2) said mission-dependent modulation look-up table indicates a second modulation value corresponding to the binary value of said second divided data segment, and
  (3) said mission-dependent modulation look-up table indicates a third modulation value corresponding to the binary value of said third divided data segment, (c) providing a modulation means, comprising, in combination, a pulse amplitude modulator, a pulse width modulator, and a pulse position modulator, wherein:
  (1) said pulse amplitude modulator receives said first divided data segment and modulates the amplitude of an output signal according to said first modulation value indicated in the modulation look-up table corresponding to the binary value of said first divided data segment, said output signal having amplitude as a first attribute, and
  (2) said pulse width modulator receives said second divided data segment and modulates the pulse width of said output signal according to said second modulation value indicated in the modulation look-up table corresponding to the binary value of said second divided data segment, said output signal having pulse width as a second attribute, and
  (3) said pulse position modulator receives said third divided data segment and modulates the pulse position of said output signal according to said third modulation value indicated in the modulation look-up table corresponding to the binary value of said third divided data segment, said output signal having pulse position as a third attribute, (d) providing a multiplexing means which is operable to receive said first attribute, said second attribute, and said third attribute of the output signal from said modulation means, and add the attributes together to form a multiplexed encoded data symbol, wherein:
  (1) said multiplexing means generates said multiplexed encoded data symbol in response to said first attribute, said second attribute, and said third attribute received in the form of said output signal from said modulation means.

2. The method of claim 1, further comprising:

(a) providing a demultiplexing means which is operable to receive a data symbol and demultiplex it into a first demultiplexed symbol, a second demultiplexed symbol, and a third demultiplexed symbol, wherein:
  (1) said first demultiplexed symbol has a pulse amplitude attribute, and
  (2) said second demultiplexed symbol has a pulse width attribute, and
  (3) said third demultiplexed symbol has a pulse position attribute, (b) providing a mission-dependent demodulation look-up table, wherein:
  (1) said mission-dependent demodulation look-up table indicates a first binary equality corresponding to said pulse amplitude attribute of said first demultiplexed symbol, and
  (2) said mission-dependent demodulation look-up table indicates a second binary equality corresponding to said pulse width attribute of said second demultiplexed symbol, and
  (3) said mission-dependent demodulation look-up table indicates a third binary equality corresponding to said pulse position attribute of said third demultiplexed symbol, (c) providing a demodulation means, comprising, in combination, a pulse amplitude demodulator, a pulse width demodulator, and a pulse position demodulator, wherein:
  (1) said pulse amplitude demodulator receives said first demultiplexed symbol and outputs a first partial data sequence according to said first binary equality corresponding to said amplitude attribute of said first demultiplexed symbol, and
  (2) said pulse width demodulator receives said second demultiplexed symbol and outputs a second partial data sequence according to said second binary equality corresponding to said pulse width attribute of said second demultiplexed symbol, and
  (3) said pulse position demodulator receives said third demultiplexed symbol and outputs a third partial data sequence according to said third binary equality corresponding to said pulse position attribute of said third demultiplexed symbol, (d) providing a combining means which is operable to receive said first partial data sequence, said second partial data sequence, and said third partial data sequence from said demodulation means, and combine the partial data sequences into a complete decoded data sequence, wherein:
  (1) said combining means generates said complete decoded data sequence in response to said first partial data sequence, said second partial data sequence, and said third partial data sequence as inputs.

* * * * *